3,398,186
PRODUCTION OF HUMIC ACID
Nelson N. Schwartz, Lawrence Township, Mercer County, N.J., assignor to FMC Corporation, New York, N.Y., a corporation of Delaware
No Drawing. Filed Dec. 23, 1963, Ser. No. 332,841
9 Claims. (Cl. 260—515)

This invention relates to the production of humic acid and more particularly, to a method for extracting humic acid from naturally occurring sources such as leonardite or from artificial sources such as the product obtained by controlled oxidation of coals.

The term "humic acid" has been widely applied to acidic solids obtained from plant decomposition. More recently, humic acids have been regarded as the intermediate products which result in the conversion of lignin and other plant materials to hard coal. It is believed that in the decomposition of vegetable matter, that that portion of the cell wall material consisting largely of lignin is converted into humic substances. In time, the humic substances are converted progressively to peat, brown coal, bituminous coal and finally, into anthracite.

Synthetic production of humic materials can also be carried out by the controlled oxidation of coals. The preferred method is by air oxidation of coal, although other oxidizing means (oxygen, ozone, or nitric acid), can also be employed. The humic acids are hard, dark, brittle solids, essentially insoluble in water with molecular weights in the range of from about 300 to about 10,000. The structure is believed to be that of condensed cyclic rings, mostly aromatic in nature with carboxylic acid groups attached either to the nucleus or to short aliphatic side chains; the molecules contain large numbers of carbonyl, phenolic and hydroxyl groups. Metallic salts are generally water insoluble, with a notably few exceptions such as the sodium, potassium and ammonium humates.

The classical method for obtaining humic acid is by extracting the humic acid source with an aqueous solution of sodium hydroxide. Humates are dissolved in the extracting solution and separated from insoluble tailings. The extract is then acidified and the humic acid is precipitated.

The aqueous caustic extraction system, though effective, has been found to be objectionable because of the low concentrations of humic acid which are dissolved in the aqueous caustic extraction liquor. The maximum amount of humic acid which can be dissolved in the extraction liquor is about 8% by weight, and this occurs only in strongly caustic solutions. In practice, because of the low concentration of humic acid salts in the extracting solution, large quantities of sodium hydroxide and water are necessary to recover humic acid in commercial operations.

In an effort to obtain more efficient recovery of the humic acid, other extraction systems have been attempted, such as flotation processes using a non-polar medium such as carbon tetrachloride, and organic solvent extraction systems using acetone and water extracting mediums. While these processes are effective, they are expensive to operate and require complicated purification techniques.

It is an object of the present invention to develop an extracting system for recovery of humic acid in a simple manner and with low cost extracting reagents, in which substantially more concentrated solutions of humic acid can be extracted than by previous caustic extraction systems.

This and other objects will be apparent from the following disclosure.

I have now found that humic acid can be recovered from naturally occurring weathered lignites or from oxidized coal by extracting these materials with an aqueous solution of a sulfite salt, in which the solution has a pH of at least about 6, separating the extract from residual insolubles, acidifying the extract to a pH of below about 4.5, and recovering solid humic acid. The sulfite salts which can be used in making up the extracting solution are sodium sulfite, potassium sulfite or ammonium sulfite; these sulfite salts can be produced in situ from the corresponding bisulfite salts or from $SO_2$.

I have further found that the humic acid recovered by the above process remains in an aqueous solution at pH's of 5 and above without precipitating.

By means of the present extracting system, humate salt concentrations of about 20% by weight of the extracting solution can be obtained compared with a maximum of about 8% by simple caustic extraction. Further, the humic acid that is recovered unexpectedly precipitates from an aqueous solution only when its pH is lowered to below about 4.5. Humic acid obtained by conventional caustic extraction normally precipitates from an aqueous solution once it reaches or falls below a pH of 7.

In carrying out the present invention, the extraction solution is made up by dissolving the sulfite salt in water and adjusting the pH of the resultant solution to a value of about 6 or above (and preferably about 8 or above). The sulfite salt which is used in the extracting solution must have a cation which forms soluble salts of humic acid in water. Among the sulfite salts which have been found operative are the sodium, potassium and ammonium sulfites.

The concentration of the sulfite salt in the extracting solution is not critical, except that enough sulfite salt should be present to extract the desired amount of humic acid from the leonardite or other humic acid source. In general, the sulfite salt should be present in the extracting solution in a weight ratio of at least 1:20 with the mineral to be extracted. The maximum amount of sulfite salt which may be used is dictated only by economic considerations and any amount up to the solubility limit in the extracting solution can be used.

The pH of the extracting solution can be regulated by adding a metal hydroxide or carbonate. The metal hydroxide or carbonate used is preferably an alkali metal hydroxide or carbonate; e.g. sodium or potassium hydroxides; the hydroxide or carbonate solution should be free of metal ions which are capable of forming insoluble salts with humic acid. The extracting solution must be at a pH of at least about 6 in order to effectively dissolve the humic acid. As the pH of the extracting solution increases, the amount of humic acid which is extracted increases. For practical considerations, it is preferred to maintain the pH of the extracting solution between 8 and 14. After the extraction is completed, the extracting solution will have a pH of from about 5 to about 12, depending upon the original pH of the extracting solution and the amount of humic acid extracted.

The temperature at which the extraction is carried out is not critical. However, for ease of extraction, it is generally convenient to use reflux temperatures. Extraction with sulfite solutions at temperatures of from about ambient to about 105° C. have been found operative, with the rate of extraction increasing with corresponding increases in temperature.

The source of humic acid which is extracted may be a naturally occurring weathered lignite such as leonardite which is found most abundantly in the states of North Dakota, Montana, and Texas. This material contains up to about 86% humic acids on a moisture and ash-free basis. Artificially produced humic acids may be prepared by the air oxidation of coal in a fluid bed at temperatures of from about 200–240° C. In this process, the coal is ground to a powdered state and heated air is passed upward through the powdered coal. Humic acid is obtained from the resulting solids by extraction with the aqueous sulfite solution.

The ability of the humic acid extracted by the present process to remain in an aqueous solution at pH values above about 4.5 is both unusual and desirable. Humic acid which is extracted by conventional caustic soda solutions becomes insoluble in water once the aqueous solution reaches neutrality, and is insoluble in aqueous solutions which are on the acid side. The reason for this unusual behavior is not known; it is not due to any material difference in the proximate analysis of the humic acid compared with conventional humic acid (see Example IV). It is believed that the sulfite solution may in some manner break down the size of the molecules in the humic acid and thereby effectively reduce the molecular weight of the humic acid.

However, regardless of this understanding, the humic acid recovered by the present process can remain in solution in an acid media above a pH of about 4.5 as desired. This is advantageous in certain fertilizer applications since the humic acid extract can be mixed with normally acid solutions for ease of soil penetration instead of having to disperse the humic acid as a solid in a liquid phase, and slow up the soil penetration.

The humic acids of the present invention are useful as additives to rubber as a reinforcement agent in place of carbon black, and as a fertilizer for agricultural applications.

The present examples are given to illustrate the invention but are not deemed to be limiting thereof.

EXAMPLE 1

A 100-gram sample of leonardite was extracted with a solution containing 8 grams of sodium sulfite, 20 grams of sodium hydroxide and 372 grams of water. The extracting solution had a pH of 13.7. Leonardite was finely ground and was extracted with the above solution under reflux conditions for about 60 hours. The resulting mixture contained 14.7 grams of solids. These were filtered from the resulting solution and the solution was made acid (to a pH of 2) by the addition of hydrochloric acid; a dark precipitate of humic acid was recovered weighing 85.3 grams.

EXAMPLE 2

An extracting solution was made up containing 2 grams of sodium bisulfite, 8 grams of sodium sulfite and 290 grams of water. Additional sodium bisulfite was added slowly with agitation until the pH of the solution was 6.5. To this solution was added 100 grams of a finely powdered leonardite and the resulting mixture was heated under reflux conditions for 60 hours. At the end of this period, 39.9 grams of insolubles were present in the mixture and were filtered from the resultant solution. The solution which had a pH of 5 was suitable for mixing with a sodium acid phosphate in the makeup of an acid fertilizer. The extract was further acidified by addition of hydrochloric acid to a pH of 2; a dark precipitate of humic acid developed in the solution. The precipitate weighed 60.1 grams.

EXAMPLE 3

One hundred grams of a finely ground leonardite was added to an extracting solution made up of 10 grams of sodium sulfite in 290 grams of water. This solution had a pH of 9.9. The solution was refluxed with stirring for about 19 hours. The resulting slurry was found to contain 35 grams of insolubles which were separated from the solution. The solution was acidified with hydrochloric acid (to a pH of 2); a dark precipitate of humic acid was formed. The resulting precipitate weighed 65 grams.

EXAMPLE 4

Run A.—Three extracting solutions were made up containing the amounts of ingredients and pH values set forth below:

| | Extracting Solution (grams) | | |
|---|---|---|---|
| | No. 1 | No. 2 | No. 3 |
| Contents: | | | |
| $Na_2SO_3$ | 50 | 40 | 40 |
| NaOH | 0 | 10 | 20 |
| $H_2O$ | 1,950 | 1,950 | 1,940 |
| pH of solutions | 10.0 | 13.3 | 13.5 |
| Humic acid extracted | 208 | 323 | 397 |

To each of these solutions was added a 500-gram sample of finely ground leonardite. The mixtures were heated under reflux conditions with constant stirring for about 16 hours. Thereafter, the solutions were cooled and the residual solids removed by centrifuging the mixture. Hydrochloric acid was then added to the solutions until a dark precipitate developed. The precipitates were dried and then weighed and are reported above. An analysis of the precipitate obtained from the extract of solution 3 was made and is given in Table I below.

Run B.—One hundred grams of leonardite was added to a caustic soda extracting solution containing 20 grams of sodium hydroxide and 880 grams of water. After 24 hours at the reflux temperature, the extract was acidified and the resulting precipitate weighing 80 grams was analyzed. The results of the analysis are given in Table I below.

TABLE I

| Analysis for— | Run A, Solution 3 (percent by wt.) | Run B (percent by wt.) |
|---|---|---|
| Carbon | 55.87 | 56.56 |
| Hydrogen | 3.98 | 4.74 |
| Nitrogen | 1.11 | 1.32 |
| Phenolic oxygen | 5.73 | 4.98 |
| Carboxylic oxygen | 8.80 | 10.24 |
| Carbonyl oxygen | 14.22 | 13.60 |
| $OCH_3$ | 0.01 | 0.01 |

EXAMPLE 5

Humic acids were prepared by the fluid bed air-oxidation of coal, by passing heated air through powdered coal maintained at a temperature of 200–240° C. One hundred grams of this treated coal was added to an extracting solution made up of 10 grams of sodium sulfite in 290 grams of water. This solution had a pH of 9.9. The solution was refluxed with stirring for about 19 hours. The resulting slurry was centrifuged and an insoluble fraction weighing 40 grams was separated. The resulting solution was acidified with hydrochloric acid (to a pH of 2); a dark precipitate of humic acid weighing 60 grams was formed.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Process of extracting humic acid values from a source thereof which comprises, using as the extracting solution an aqueous solution of a sulfite salt selected from the group consisting of sodium sulfite, potassium sulfite and ammonium sulfite, said solution having a pH of at least about 6, and separating the extracting solution containing humic acid values from the insoluble residues.

2. Process of claim 1 in which said extracting solution is acidified to a pH of below about 4.5 and solid humic acid is recovered from said extracting solution.

3. Process of claim 1 in which the source of humic acid is leonardite.

4. Process of claim 1 in which the source of humic acid is an oxidized coal.

5. Process of claim 1 in which the sulfite salt is sodium sulfite.

6. Process of claim 1 in which the pH of the extracting solution is from about 8 to about 14.

7. Process of claim 1 in which the extraction is carried out at reflux temperatures.

8. As a new composition of matter, an aqueous solution of humic acid having a pH of from about 5 to about 7, said humic acid being obtained by the extraction of a humic acid source with an aqueous solution of a sulfite salt selected from the group consisting of sodium sulfite, potassium sulfite and ammonium sulfite, said aqueous solution of a sulfite salt having a pH of at least about 6.

9. As a new composition of matter, a humic acid composition which is soluble in an aqueous solution having a pH above about 4.5 and which is obtained by extraction of a humic acid source with an aqueous solution of a sulfite salt selected from the group consisting of sodium sulfite, potassium sulfite and ammonium sulfite, said aqueous solution of a sulfite salt having a pH of at least about 6, and recovery of said humic acid by acidification of said aqueous solution to a pH of below 4.5.

References Cited

UNITED STATES PATENTS 2,815,329   12/1957   Germain _____ 260—515

OTHER REFERENCES

Fowkes, W. W. and Frost, C. M., Leonardite: Alignite By Product, U.S. Bureau of Mines, Report of Investigations 5611 (Dept. of Interior), pages 3–4, 1960. TN1. V8.

LORRAINE A. WEINBERGER, *Primary Examiner.*

M. G. BERGER, *Assistant Examiner.*